United States Patent [19]
Ornstein

[11] Patent Number: 5,444,796
[45] Date of Patent: Aug. 22, 1995

[54] METHOD FOR UNSUPERVISED NEURAL NETWORK CLASSIFICATION WITH BACK PROPAGATION

[75] Inventor: Leonard Ornstein, White Plains, N.Y.

[73] Assignee: Bayer Corporation, Tarrytown, N.Y.

[21] Appl. No.: 139,396

[22] Filed: Oct. 18, 1993

[51] Int. Cl.$^6$ .............................................. G06K 9/00
[52] U.S. Cl. ........................................ 382/157; 395/23
[58] Field of Search .................. 395/23, 27; 382/14, 382/15

[56] References Cited

U.S. PATENT DOCUMENTS

| | | | |
|---|---|---|---|
| 5,182,794 | 1/1993 | Gasperi et al. | 395/23 |
| 5,247,206 | 9/1993 | Castro | 395/23 |
| 5,276,770 | 1/1994 | Castelaz | 395/23 |
| 5,359,699 | 10/1994 | Tong et al. | 395/23 |
| 5,384,895 | 1/1995 | Rogers et al. | 395/23 |

*Primary Examiner*—Leo H. Boudreau
*Attorney, Agent, or Firm*—Morgan & Finnegan

[57] ABSTRACT

An unsupervised back propagation method for training neural networks. For a set of inputs, target outputs are assigned 1's and 0's randomly or arbitrarily for a small number of outputs. The learning process is initiated and the convergence of outputs towards targets is monitored. At intervals, the learning is paused, and the values for those targets for the outputs which are converging at a less than average rate, are changed (e.g., 0→1, or 1→0), and the learning is then resumed with the new targets. The process is continuously iterated and the outputs converge on a stable classification, thereby providing unsupervised back propagation. In a further embodiment, samples classified with the trained network may serve as the training sets for additional subdivisions to grow additional layers of a hierarchical classification tree which converges to indivisible branch tips. After training is completed, such a tree may be used to classify new unlabelled samples with high efficiency. In yet another embodiment, the unsupervised back propagation method of the present invention may be adapted to classify fuzzy sets.

13 Claims, 4 Drawing Sheets

METHOD FOR UNSUPERVISED NEURAL NETWORK CLASSIFICATION WITH BACK PROPAGATION

BACKGROUND OF THE INVENTION

The present invention relates generally to pattern recognition and more particularly, to a method for classification with neural networks, or their simulations, based on back propagation, but in a new mode where no external supervised training or teaching is employed.

The field of neural networks is directed to developing intelligent machines which use computational methods that are based on mechanisms which are presumed to be related to brain function. Driving this development is a class of problems which are intractable or, so far, not well suited to solution by conventional serially programmed digital computing technology, but often, are easily solved by humans or animals. Broadly, these problems relate to the recognition of patterns such as recognition of different sounds and of various kinds of images (including alphanumeric characters).

Neural network architectures have a massively parallel interconnection of simple identical computational elements which are referred to as neurons. Each neuron may modify the relationship between its inputs and outputs by some operation. The characteristics and processing power of a given neural network are dependent on several factors, including: the connection geometry, the operations used for the interaction between neurons, the learning rules used to modify the connection strengths, and the learning method itself. For pattern recognition, a neural network is taught, or spontaneously learns, to classify input patterns as one of a plurality of classes that the neural network has learned, and then is used to classify additional inputs, each as one of a plurality of classes.

The classical as well as the neural-network process for classifying a population of samples with l properties each, into 2 sub-classes, is often conceptually reformulated so that it is cast in terms of the separation of the samples, each represented by a point in an l-dimensional space, using an (l−1)-dimensional hypersurface, such that all members of one sub-class fall on one side of the hypersurface, and all members of the other class fall on the other side. The l-dimensional line from the origin of the coordinate system to the sample point, specified by the l sample coordinates, is referred to as the l-dimensional sample-vector, input-vector or feature-vector. When l=2, and if the space is Euclidean, then if a straight line (a hyperplane, with (l−1)=1 dimension) can be drawn so that all points of one sub-class fall on one side of the line, and all of the others on the other side, the population is said to be linearly separable.

This definition of linear separability is generalized to spaces of any dimensionality; the l-dimensional population is said to be linearly separable if an (l−1)-dimensional hyperplane can partition the samples into the 2 sub-classes. If it takes a hypersurface other than a hyperplane, (e.g., a hypersphere) to provide separation then the population is not linearly separable. For instance, if l=2, the hypersphere might be a circle with its center in the middle of a cluster of sample points, and its perimeter surrounding the cluster, so that the cluster sub-class is separated from the residual subclass (i.e., samples distributed throughout the rest of the space) by the "hyperspherical surface."

Populations that may be separated by combinations of hyperplanes, however, are said to be piece-wise linearly separable. For example, for l=2, a circle which encompasses a population can be approximated by a number of line segments. Piece-wise linear separation covers a very large category of classification problems. Nevertheless, it also can be easily shown that there can exist "intertwined" connected classes, in l-dimensional space, which cannot be separated by any number of (l−1)-dimensional hyperplanes, and such classes not only are not linearly separable, but further are not piecewise linearly separable.

Two extremes of distributions of samples in an l-dimensional (but not necessarily Euclidean) space are described by:

(1) Samples that are distributed with uniform density throughout the space. In this case, the space can be divided with hypersurfaces into groups of contiguous sample "sub-classes" in an infinite number of ways, all equally "unnatural". Nevertheless, any one of such classifications, though unnatural, may be more useful or more economical for labelling or coding of newly observed samples than using the raw l coordinates of each sample point; and (2) Samples that are distributed non-uniformly in the space, (i.e., clustered), with large empty gaps between the clusters. Such distributions are amenable to unique partitioning with many kinds of hypersurfaces that pass only through regions free of samples. Members of such kinds of sub-classes can be identified reproducibly with confidence and "meaning". Such sub-classes are "natural sub-classes", and are typical of most named classes generally used in thought and speech (e.g., note the large gaps between chairs, stars and even dogs and cats).

During the last ten years, significant and exciting technologies have been described and explored for recognizing and extracting patterned information from data sets for their classification, using neural networks. These new methodologies are now usually referred to under the rubrics of Parallel Distributed Processing or Connectionist technologies, and have arisen mainly from studies of, and interests in the functioning of biological nervous systems. They follow from attempts to model such functions with networks of rather simple processors connected in manners that crudely simulate natural neural nets. Instead of being programmed in detail to do their task, neural networks learn from experience.

Two general types of learning methods for neural networks are supervised and unsupervised learning. These general methods can be described as follows:

(1) Supervised learning requires presenting the network with a training set of input samples (each sample is represented by a descriptive data set, e.g., an l-dimensional input vector) and an associated label (each label represents a target for the output). The set of corresponding labels are determined according to prior classification performed separately from the neural network by an expert. Typically, this prior classification involves computationally intensive methods and/or extensive human experience. The network learns by adjusting parameters such that the outputs generated by the network in response to the training set of input vectors are within an acceptable error margin compared to the respective expert-supplied targets for the training set of input samples. The trained network is subsequently used to bypass the expert to automatically recognize and classify additional input samples from unlabeled data sets.

(2) In contrast, unsupervised learning requires the automatic "discovery" of clusters of samples among a training set of unlabelled input sample data sets on the basis of some measure of closeness, and the sample population is thereby partitioned into sub-classes which are then labelled, entirely without expert intervention. Subsequently, the network is used to automatically recognize and label additional data sets of unlabelled samples.

Work on supervised learning with neural networks goes back to Rosenblatt's Perceptrons and to Widrow's ADALINE [Rosenblatt, F. Principles of Neurodynamics, Spartan (1962) and Widrow, B., and Hoff, M. E., Jr. "Adaptive Switching Circuits" IRE WESCON Convention Record, pt.4, 96–104 (1960)]. Widrow developed a delta rule which could be used for systematically implementing learning in a two-layer network (having an input layer and an output layer) but was not applicable to multi-layer networks. In 1969, Minsky and Papert, [Minsky, M., and Papert, S. *Perceptrons,* MIT Press (1969)], proved that 2-layer networks, like those studied by Widrow and by Rosenblatt, fail to separate subclasses which require a hypersurface more complicated than a hyperplane.

In 1986, Rumelhart, Hinton, and Williams found that learning could be implemented in a multi-layer feedforward neural network [now frequently called a Multi-Layer Perceptron (MLP)], by back propagation of error based on a Generalized Delta Rule, [Rumelhart, D. E., Hinton, G. E., and Williams, R. J. "Learning Representations by Back Propagating Errors", Nature, 323,533–536 (1986)]. Essentially the same delta rule was independently developed by Werbos [Werbos, P., *Beyond Regression: New Tools for Prediction and Analysis in the Behavioral Sciences,* Ph.D. Thesis, Harvard University, August, 1974], by Parker [Parker, D. B. "Learning-Logic" TR-47 Massachusetts Institute of Technology, Center for Computational Research in Economics and Management Science, (1985)], and by le Cun [le Cun, Y. "Learning processes in an asymmetric threshold network", in Disordered Systems and Biological Organization, F. Soule, E. Bienstock and G. Weisbuch, Eds., (Springer-Verlag, Les Houches, France, 1986) pp. 233–340]. Currently, the back propagation method, referred to simply as "backpropagation" or "back propagation," is perhaps the most popular method of supervised learning.

Back propagation automatically acquires internal sets of connection-weights or synaptic states which, when three or more layers are used, permits even the separation of samples that map nonlinearly from layer to layer, that exhibit complex connectivity and that are even not linearly separable. Rumelhart, Hinton, and Williams have called the complex internal states generated by back propagation "internal representations" [Rumelhart, D. E., Hinton, G. E., and Williams, R. J. "Learning Internal Representations by Error Propagation", in D. E. Rumelhart and J. L. McClelland (Eds.) Parallel Distributed Processing MIT Press, 318–362 (1986)].

In a "layered" back propagation network, a number of layers of neurons or nodes are connected in series. The progression is from input layer to output layer. Typically, each node in the input layer is connected to every node in the next layer, and this pattern is repeated through the layers, terminating with a final output layer. All layers between input and output layers are known as "hidden" layers. A signal passing through a connection (often referred to as a synapse), is multiplied by a connection-specific weight. The weighted signals entering a node are summed, a bias is added and then the signal is transformed non-linearly by a threshold [usually a sigmoid function of the form, $S_o = (1+e^{-\Sigma})^{-1}$, where $\Sigma$ is the biased sum of weighted signals entering the node, and $S_o$ is the output signal from that node] and the output signals are fed to the next layer, until the final output layer is reached.

Supervised learning in such networks is accomplished by adjusting the individual connection-specific weights until a set of trained weights is capable of transforming each and every member of the input-training-set into an output vector which matches its target label within some prescribed level of precision. The network has then "learned" the classification it was taught, and has acquired the useful ability to thereafter rapidly classify new unlabelled samples drawn from the same general class as the training set, into the appropriate learned sub-classes. The procedure for adjusting weights, which is the key to the power of back propagation, is the Generalized Delta Rule, and this depends intimately upon the labelled targets provided by an expert teacher. Thus, the ability of the network to classify new unlabelled inputs depends completely on the prior classification of a teacher-labelled training set.

Unsupervised learning methods for neural networks are associated with the names of Grossberg and Kohonen [e.g., see Carpenter, G., and Grossberg, S. "The ART of Adaptive Pattern Recognition by a Self-Organizing Neural Network", Computer [March] 77–87 (1988); and Kohonen, T. Self-Organizing and Associative Memory, Springer Series in Information Science, 8 (1983)]. The ART 1 and ART 2 of Grossberg and the networks of Kohonen lack hidden layers, and therefore, like Rosenblatt's Perceptron, are subject to the same limitations of 2-layer networks noted by Minsky and Papert. Also, unsupervised neural networks generally have been more difficult to implement and have performed more poorly than multi-layer back propagation networks.

Unsupervised learning with non-neural-net approaches has also been discussed for a long time (e.g., Ornstein, L. "Computer Learning and the Scientific Method: A Proposed Solution to the Information Theoretical Problem of Meaning" J. Mt. Sinai Hosp. 32, 437–494 (1965)). Ornstein presented a procedure for generating hierarchical classifications based on informationally-weighted similarity measures. Neural network approaches have also employed hierarchical procedures, such as Ballard's method for minimizing the so-called "scaling problem", (the slower-than-linear decrease in the rate of convergence and therefore, the greater-than-linear increase in the learning-time with increasing numbers of network layers), by stacking separate networks in series, (Ballard, D. H. "Modular Learning in Neural Networks," Proceedings of the Sixth National Conference on Artificial Intelligence, 1, 279–284 (1987)), and the work of Sankar and Mammone on Neural Tree Networks, (Sankar, A., and Mammone, R. J. "Growing and Pruning Neural Tree Networks," IEEE Transactions on Computers 42, 291–299 (1993)). A review of hierarchical methodologies is provided by Safavian et al. (Safavian, S.R., and Landgrebe, D. "A Survey of Decision Tree Classifier Methodology", IEEE Transactions on Systems, Man and Cybernetics 21, 660–674 (1991)). Although hierarchical methodologies represent a powerful means for classification, their application to unsupervised neural networks has been limited.

Despite the progress and effort made in the field of neural networks, particularly since the advent of back propagation, further developments and improvements in neural network learning methods, and particularly, advances in unsupervised learning methods, continue to be pursued by researchers in this field.

In particular, it would be advantageous to have a method for implementing learning in a neural network which combines the attributes of unsupervised learning with the convenience and power of back propagation. However, there has been only the slightest suggestion that back propagation could be used for unsupervised learning, (i.e., Zipser, David, and Rumelhart, David E., "The Neurobiological Significance of the New Learning Models in Computational Neuroscience," E. L. Schwartz, Ed., MIT Press, Cambridge, 1990, pp. 192–200). Indeed, M. Caudill [Caudill, M. "Avoiding the Great Back-propagation Trap" AI Expert Special Edition (January), 23–29 (1993)] states: "If you have no information at all to give the network, you are automatically constrained to unsupervised training schemes "and " if you want to use unsupervised training, you have completely eliminated backpropagation networks."

Accordingly, an object of the present invention is to provide a method for unsupervised neural network classification based on back propagation.

A related object of the present invention is to provide an improved learning method for neural networks that does not require prior classification of the training set.

A further object of the present invention is to provide an unsupervised back propagation neural network learning method which includes a method for automatically discovering natural classes.

Yet another related object of the present invention is to provide an unsupervised learning method, including hierarchical classification, for discovering and efficiently classifying natural classes among sets of classes using feedforward multilayered networks.

The foregoing specific objects and advantages of the invention are illustrative of those which can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variations which may be apparent to those skilled in the art.

SUMMARY OF THE INVENTION

The present invention overcomes limitations of the prior art and further achieves the above objects and advantages by providing an unsupervised back propagation neural network learning method. Each sample of an input training set is assigned an arbitrary numeric label for each component of a target vector for an output vector. Back propagation is executed for the input training set, thereby generating a set of output vectors, each output vector corresponding to an input sample. Based on the rate of convergence of the output vectors toward the target vectors, the values of the slowest converging target values are permuted, and these updated target values are used for executing another back propagation cycle. This sequence of performing back propagation and updating the target values according to convergence is repeated until the output values are commensurate with the target values within a predetermined tolerance. In an embodiment of the present invention, the trained network is then used to classify additional samples, thereby augmenting the classified samples which comprise sub-classes. Each augmented sample sub-class is then further classified by performing an unsupervised back propagation training method according to the present invention. This process of using a trained network to generate augmented sub-classes, followed by training a network to classify the augmented sub-classes is repeated until the step of classifying each sub-class does not substantially yield further sub-classes, thus generating an hierarchical classification tree. In a further embodiment, the present invention is adapted for efficient classification of "fuzzy" populations.

BRIEF DESCRIPTION OF THE DRAWINGS

The invention will be described in greater detail below by way of reference to the accompanying drawings, wherein.

DETAILED DESCRIPTION OF THE PREFERRED EMBODIMENT

Although special parallel hardware implemented in silicon [e.g., Holler, M. A. "Multi-Layer Neural Network Employing Multiplexed Output Neurons", U.S. Pat. No. 5,087,826 1992] or superconductors [Ornstein, L. "Data Processing", U.S. Pat. No. 3,633,171 1972] would produce extremely fast executions, it is more convenient to examine performance of neural nets by simulating them in software for use on commercial serial digital computers. For back propagation networks, shell programs which simulate the nets are quite attractive [e.g., see Bigus, J. P. "Neural Network Shell for Application Programs", U.S.Pat. No. 5,124,665 1992] and such a shell, which is designed to operate within the environment of a standard commercial spreadsheet program, like Microsoft ® Excel TM, is extremely convenient [e.g., see "Neuralyst TM Version 1.3 User's Guide", Neural Network Technology for Microsoft·Excel TM, Epics Systems, Sierra Madre, Calif. (1993)]. All methods of the present invention are easily implemented with a program such as Neuralyst TM, Version 1.3.

Supervised Back Propagation

Figure 1:
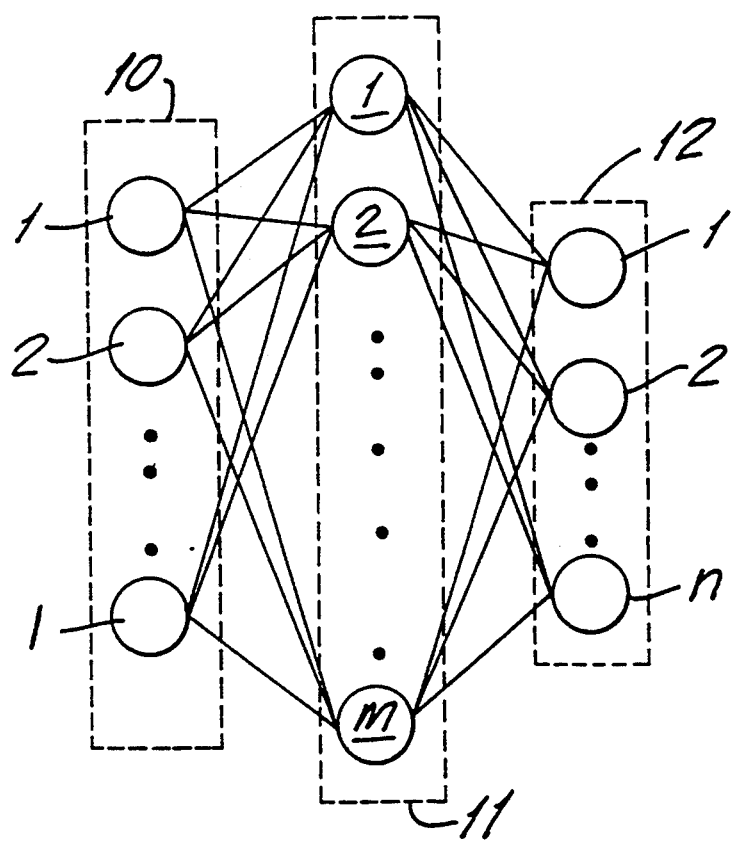
FIG. 1 schematically depicts a layered neural network architecture.

As a basis for understanding the present invention, it is helpful to review some further details of the operation of the prior art back propagation method for supervised learning. FIG. 1 schematically depicts a simple layered network having an input layer 10, a hidden layer 11, and an output layer 12. Every input sample is represented by a set of measurements of l properties, in a list of l numbers, which comprise the coordinates of the sample-vector (these are usually pre-normalized so that the magnitudes of each number range in the interval from 0 to 1). The neural net input layer 10 is constructed with l input neurons or nodes, and each property (or dimension) is assigned to one neuron. Each input node is connected by one link to each node in the next hidden layer 11 which contains m nodes, and in a typical 3-layer network, such as the one shown in FIG. 1, each of the m nodes in the hidden layer is connected by one link to each of n nodes in an output layer.

As stated above, the number of input layer 10 nodes, l, is set by the number of measured properties of each sample. The heuristic methods for choosing the number of nodes in the hidden layer, m, constitute a special subject of back propagation which will not be discussed here, since it has little impact on the differences between supervised and unsupervised learning. The number, n, of output nodes is set by the number of classes one wishes to train the network to recognized, and can be decided in essentially two different ways.

For example, assuming that one wishes to teach the network to recognize the differences between two kinds of samples which belong to well-known sub-classes, A and B, a network could be constructed where the number of nodes in the output layer 12, n, equals 1. A Target Table is used for tabulating the desired outputs for each input vector from a training set of input vectors, according to the membership of the input vector. For instance, the desired output is set to either 1 or 0, depending on whether the input training set vector belongs to sub-class A or B, respectively. This assignment of values of 1 or 0 in the Target Table to each training sample, by the trainer, constitutes the supervisory step whereby prior classification knowledge is introduced into a back propagation network. In this simple example where there is only one output node, the Target Table has a row for each input sample vector and only one column for recording the value of each desired output (i.e., 1 or 0) of each input sample vector.

An alternate way to represent a population of samples having two sub-classes is to set the number of output nodes n=2, rather than 1, and to assign two Target columns in the Target Table for each sample. Column 1 identifies membership in sub-class A, and column 2, membership in sub-class B. Entries into the Target Table for input samples from the training set classified as belonging to sub-class A would be 1 in column 1, and 0 in column 2. Conversely, entries in the Target Table would be 0 in column 1, and 1 in column 2 for input samples from the training set belonging to sub-class B.

For cases where the relationships, if any, among the classes is uncertain or unknown, n must generally be set equal to the number of known sub-classes, with one Target column for each sub-class. A 1 will be entered in each of the appropriate sub-class columns, and 0's in all the other sub-class columns. If a sample belongs to more than one sub-class, its Target row will contain 1's in each appropriate column, and 0's in all the rest of its columns.

In a back propagation network, there is also an equivalent of an "Output Table", with rows and columns mapped, one to one, to the Target Table. When the learning procedure is activated, input values for the first sample are propagated "forward" through the hidden layer 11 (or hidden layers) to the output layer. The strength of the signal, at each connection, is modified by a connection-specific weight (typically, each connection weight is initially assigned an arbitrary random value between $-1$ and $+1$), and the summed input to each node is also biased and transformed with the logistic sigmoidal function before it is distributed to the next layer of connections. The final output signals, emanating from the output layer 12, in response to the first sample applied to the input layer 10 are placed in the first row of the Output Table. The values in the Output Table are compared to the corresponding values in the Target Table and, using the Generalized Delta Rule, the process readjusts weights (which, as noted above, are usually initially random and arbitrary) associated with each connection between nodes, propagating "backwards" from output to input, so as to reduce differences ("delta's") between Target and Output. This process is repeated for each of the training samples consecutively, cycling through the entire set of training samples as many times as is necessary to reduce differences between Targets and Outputs to less than some previously assigned maximum acceptable residual training error, or alternatively, until some specified stoppoint (e.g., the completion of a particular number of cycles) has been reached. When that point is reached, the process terminates, and the network is said to be "trained".

Figure 2:
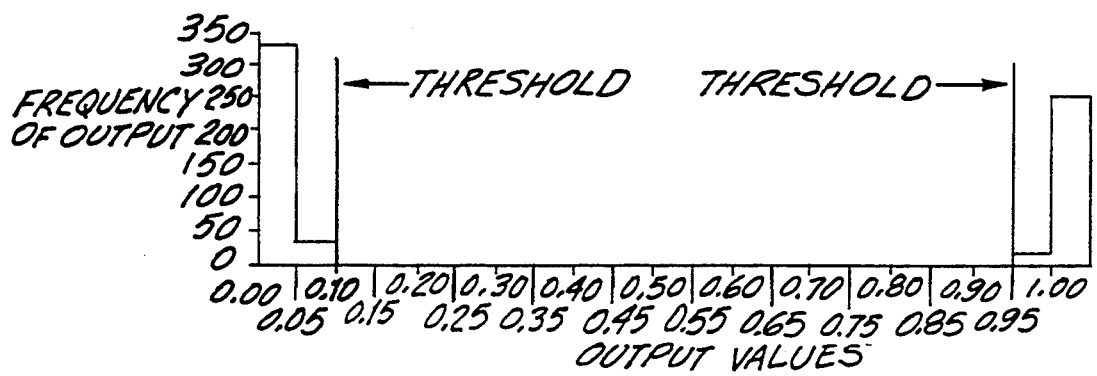
FIG. 2 depicts a histogram of the output values of an output column for a neural network.

Referring to FIG. 2, which depicts a histogram of the output values of an output column, each threshold boundary, representing a "maximum acceptable training error" (0.05 in this case), can be viewed as a line-surrogate for a sub-class-separating hypersurface.

There will be cases where some "transitional" samples in a training set form a more or less continuous distribution between two sub-classes:

In the case where training is continued until the Outputs match the Targets within the acceptable error, a clean split usually will have been forced on that transitional set of samples, assigning them to one or the other of the extreme sub-classes, as a result of the sigmoid transform, and a sensitivity to any statistical unevenness in the distribution of the transitional samples.

However, in a case where the training is terminated after a prescribed number of cycles of iteration (but where that number of cycles is fewer than in the residual-error-terminating case above), some of the Outputs for the transitional samples will usually be found to be distributed around 0.5. If the training is repeated by restarting the back propagation with a new random set of weights, the robustness of the performance of the back propagation method can be tested. If the transitional samples are repeatedly classified with outputs near 0.5, the result almost certainly reflects their intermediate status, rather than a hangup at a local, instead of a global, minimum of the back propagation process. In general, the more adequately the training set of samples represents the population (class) from which it is drawn, and the larger the training set, consecutive training runs on either the same or different training sets will be more repeatable, and new samples will be classified more correctly by the network.

While the foregoing overview of back propagation does not describe the mathematical principles and details of recalculating the weights, (which, for example, are thoroughly discussed in Rumelhart, Hilton, and Williams 1986, and in Neuralyst TM 1.3 User's Guide) it should be understood from this overview that back propagation represents a well understood, straightforward and powerful method for implementing the formidable task of optimizing the internal weights that are used to train a feedforward network. The foregoing overview, however, also highlights the limitations of supervised back propagation: the network is coerced to learn an a priori classification of the training set through the implicit dependence of the training process on the Target vectors, assigned by the supposed expert supervisor.

Unsupervised Back Propagation

The present invention overcomes these limitations by featuring the advantages of unsupervised learning while exploiting the attributes of back propagation. Learning without supervision (i.e., without a trainer or teacher) implicitly requires that there are no trainer-provided Targets; rather the network itself "discovers" sub-classes within a training set (i.e., classifies the training set).

Figure 3:
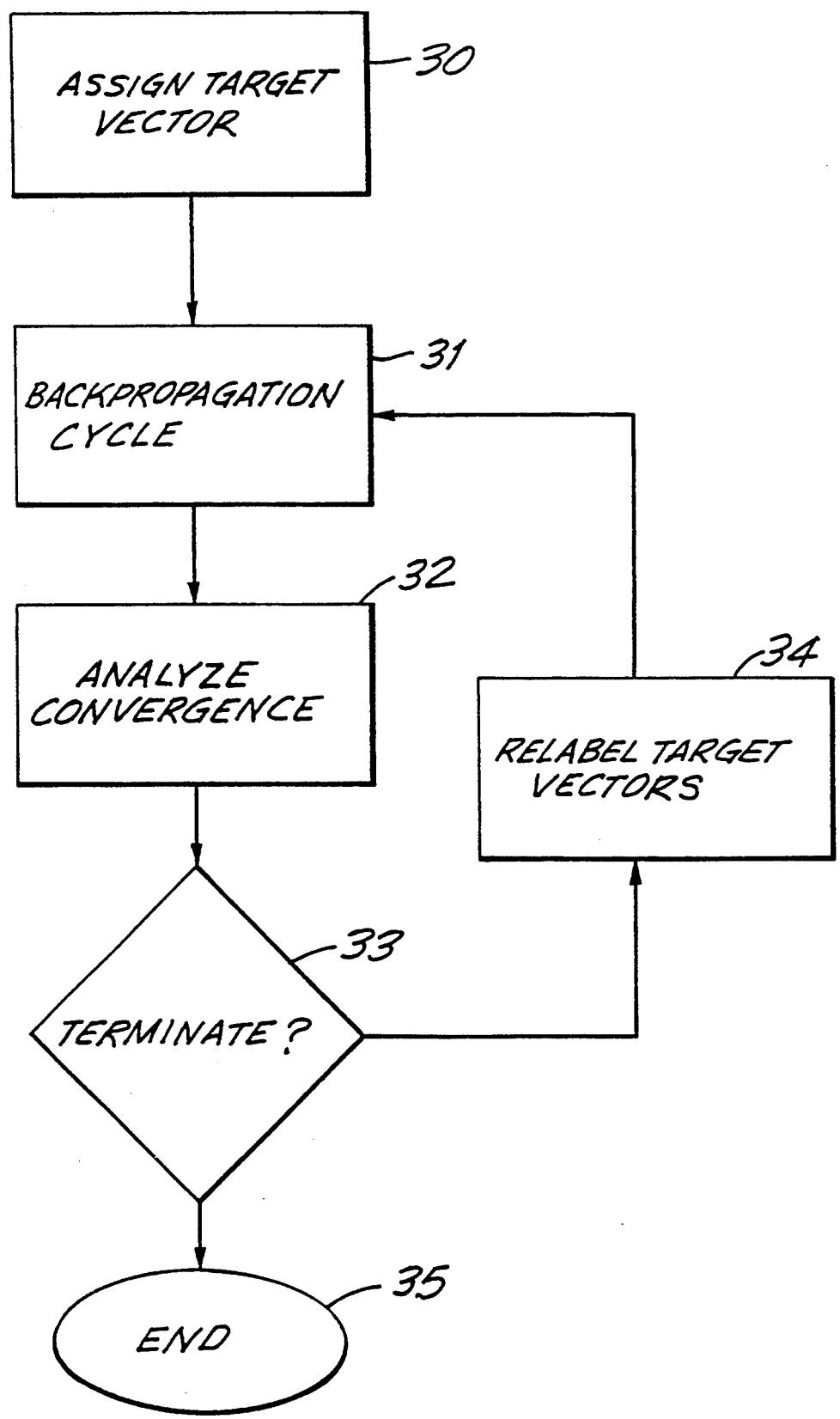
FIG. 3 is an operational flowchart for the method of implementing unsupervised back propagation according to the present invention.

FIG. 3 is an operational flowchart for the method of implementing unsupervised back propagation according to the present invention. In step 30, the Target values are assigned as 1's or 0's in a manner which does not depend on prior knowledge of sub-class membership of training samples. For instance, the Target values could be assigned arbitrarily, which in this context includes randomly. In step 31 the network executes a back propagation run for one, or more cycles through the input training set, using the assigned Target values. Next, in step 32, the Outputs are compared to the assigned Targets. Typically, this comparison indicates that Outputs are generally very poorly matched to Targets. For a population containing natural sub-classes, by chance alone, however, a few of the arbitrarily set Target values will probably have been "usefully labelled", and it is likely, on the average, that the corresponding Outputs will have converged somewhat closer to those Targets (in the short training period) than will the rest of the Outputs towards their assigned Targets.

The Outputs associated with "unusefully labelled" Targets, will generally, on the average, converge towards their Targets by a less-than-average amount. This permits identifying "errors in Target assignment" with low, but significant confidence. If, in step 33, a termination condition is not satisfied, then in step 34 the Targets are relabelled (i.e., reassigned) on the basis of some measure of such convergence. In the preferred embodiment, the measure of convergence of Outputs towards Targets used in step 32, is based on a column average that is calculated for each Output Table column. Each Output value of a given column is compared to the column average for that column. If the Output value is greater than the column average, the conjugate Target value is replaced with a 1 (if it is not already a 1); and if the Output value is less than the average, the corresponding Target value is replaced with a 0 (if it is not already a 0).

The back propagation run (step 31) is then repeated, using the updated targets. Since, on the average, a larger fraction of the Targets are now usefully labelled according to sub-classes in the training set, the weights associated with properly labelled members of "real" classes begin to tighten and further favorably influence the convergence of both properly and improperly assigned Targets. By repeating these operations over many cycles, the process converges on stable classifications.

Internal variables, such as those known in the art as "momentum", "learning rate" and "input noise", are adjusted according to the same guidelines that are commonly used to optimize standard back propagation. For natural sub-classes, the rates of convergence of Outputs, (though initially severely perturbed by both the random assignments of weight and of Target values), are ultimately determined by the statistics of the sample properties of the training set. Further, the design of the process ensures that the weight-noise and Target-noise are steadily reduced, as the network learns.

After an iteration, if the termination condition is met in step 33 then the training session is completed (i.e., step 35). Typically, the termination condition is based on whether the Outputs have converged to the targets within some predetermined residual acceptable training error, or whether a predetermined number of iterations have been performed. It can be understood that if only the latter termination condition is used, it is not necessary to perform step 32 before step 33, and thus the operational flow chart of FIG. 3 may be modified such that step 31 is followed directly by step 33, and step 32 is incorporated as the first part of step 34 (i.e., compare convergence and relabel target vectors accordingly).

Such a method of classification is properly designated as unsupervised since the network is not furnished with fixed known input sample-vector Target-vector pairs that were determined in some separate prior classification step. Instead, the network itself generates and learns the classification of the input training set.

Another embodiment of the present invention indicates one of the flexible and useful ways in which this unsupervised back propagation method may be modified. Referring again to FIG. 3, according to this embodiment, after step 30 is performed, the iteration of steps 31, 32, 33, and 34 proceeds until some fraction of the desired stop-point (e.g., about ¼ of percentage of the way) is reached. For instance, if the desired stop point were based on the percentage of output vectors within the residual training error, then "¼ of the way" refers to the point where about ¼ of the output vectors fall within the residual training error. The existence of this condition may be determined in step 32.

When this condition is met, in addition to relabelling the target vectors in step 34, the weights are reinitialized [e.g., a new set of random weights are loaded into the network]. Then, the training iteration, beginning with step 31, is initiated using the new target vectors and the new set of weights. According to this embodiment, the iteration continues until a second fraction of the desired stop point is reached (e.g., ½ the way). Again, when this condition is met, not only are the target vectors relabelled but also, a new set of weights are assigned to the network. The iteration is restarted and continued until the termination condition, step 33, is satisfied.

It is obvious that variations of this embodiment include varying the number of times that random weights are assigned to the network after the initial step 30. In the example given, weights were reinitialized twice;

however, any number of times, including only once, is possible. Further, the values of the fractional stop points may also be varied.

As a result of this alternative embodiment of the present invention, the classification produced is likely to be somewhat more robust because it is less likely that it will converge to, and hang up at some local, rather than global minimum of the sample class. However, such training will be slower.

Generally, the number, n, of output nodes in a back propagation network must approximate the number of sub-classes to be generated. Prior knowledge or experience may provide information suggesting a possible range of sub-classes, and the performance of networks having a different number of output nodes within this range may be compared; however, this would constitute some degree of supervision. Generally, however, implementing unsupervised learning when there is no information indicating how the samples will classify requires a method and means for "extracting" the sub-classes. In the preferred embodiment of the present invention, a hierarchical method is implemented wherein unsupervised back propagation is performed in a manner that is designed to extract at least the number of natural sub-classes in the population.

Figure 4:
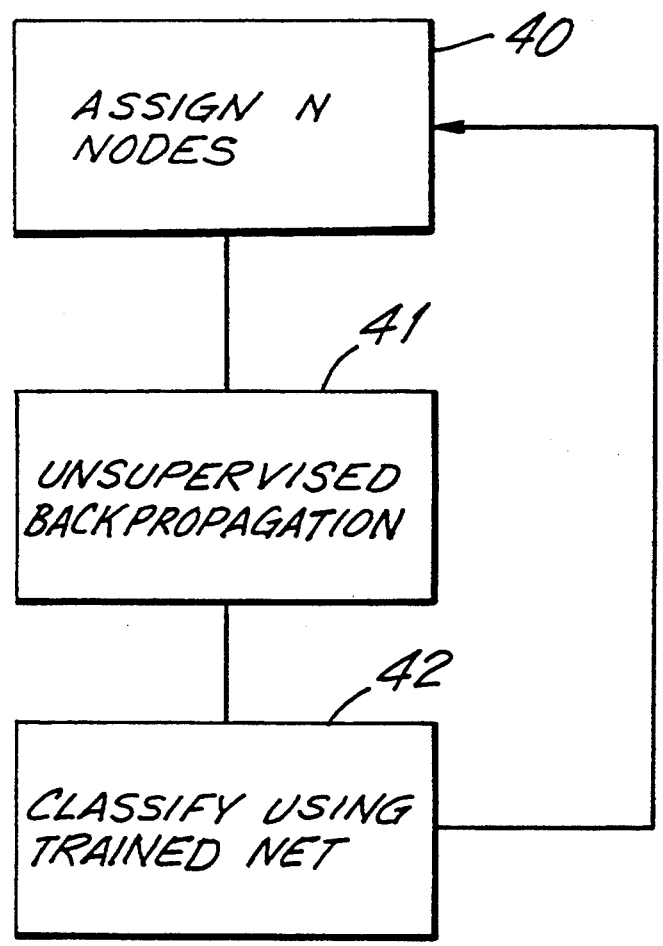
FIG. 4 is an operational flowchart for hierarchical classification in accordance with an embodiment of the present invention.

Referring to FIG. 4, the hierarchical classification method employed in accordance with the present invention is described. First, in step 40, a network is defined having n output nodes (to facilitate the description of this method, n is set to equal one). Then, in step 41, the unsupervised back propagation method is executed in accordance with the method of the present invention. For the example where n=1, this procedure divides the training set into two sub-classes. Next, in step 42, an additional number of samples drawn from the population which was the source of the training set are classified by the network trained in the previous step. The size of this new sample set will usually be made equal to the number of samples in the original training set. This classification is performed with the very fast so-called "testing" mode of the trained back propagation network.

With these additional classified samples, there are two sub-groups of samples, each with samples comparable in number to the original training set, belonging to a separate "branch" (i.e., sub-class) of the original class or "tree trunk". By separately applying the unsupervised back propagation method (i.e., step 41 via step 40) using the members of each of these sub-classes as input samples, each sub-group is further subdivided into two additional sub-classes (assuming that a network with one output node is employed again), resulting in a total of 4 sub-sub-classes at this stage. As depicted in FIG. 4, the operational flow from step 42 proceeds to step 40. In accordance with the foregoing description, there is no modification of the network topology performed by step 40 upon iteration from step 42 and thus, in step 41 the same network is used for unsupervised back propagation throughout the branching levels. In a more general case, however, upon each iteration from step 42, the network topology may be modified in step 40. For example, it may be advantageous to initially sub-divide the training samples into more than two sub-groups; whereas subsequent iterations may employ fewer output nodes than previous "levels".

By iterating this general procedure, a "classification tree" is grown. With populations composed of natural subclasses, the process ultimately terminates on substantially homogeneous branch-tips. Many possibilities exist for establishing a termination condition. Preferably, the iteration may be terminated when the unsupervised back propagation step 41 does not substantially generate more than one sub-group in response to an input sample set, or when a predetermined number of iterations have been performed. The unique sets of connection-weights, "tailored" for the particular partitioning at each branching point in the classification tree, (i.e., Rumelhart's "internal representations") are saved and stored for each sub-branch. Advantageously, the generation of such a classification tree is determined by the statistical distribution of sample properties, rather than by any preconceived notion of what kinds, and how many "natural" classes are contained within the parent population.

Many additional variations may be implemented in connection with the hierarchical classification method. For instance, it may sometimes be advantageous to asymmetrically sub-divide sub-groups generated from the same classification step (i.e., having the same "trunk"), whereby a different network topology is used for implementing unsupervised back propagation for the respective subgroups. In some cases, it may be advantageous to no longer classify a sub-group (i.e., terminate a branch) while continuing to classify another sub-group having a common trunk. Moreover, it may be useful to terminate training before homogeneity has been achieved.

In general, for hierarchical classification, if p branch tips are "discovered ", there will be about $\log_{n+1}p$ levels of branching, and it will take $\log_{(m+1)}p$ very fast consecutive matchings in the testing mode to classify a new sample. For example, if p is as large as $2^{20}$ ($\approx 10^6$), and n=1, $\log_{m+1}p=20$, classification of an input vector will take only 20 binary steps. To achieve the same level of classification with a single network in a single training run would require n=one million output nodes and mp more connections than are required for the above network with n=1 output node. Such a larger network is more difficult to implement, and will generally take much longer to train. It can be shown that classification trees are most efficient when (n+1), the number of branches at each dividing point on the tree, is between 2 and 4, but that efficiency drops less than 50%, even when (n+1)=10. Thus, n is preferably less than about 10. Such classification trees of small networks are much more efficient than massive single networks.

The hierarchical procedure described hereinabove, parallels that for generating hierarchical classifications presented by Ornstein, (see supra, Ornstein 1965), whereby the herein unsupervised back propagation method corresponds to the therein informationally-weighted similarity measures.

Additional modifications can provide other valuable features to the present invention. For instance, if the procedure for labelling the branches of the classification tree follow the prescription in Ornstein (i.e., see supra, 1965), a Significant Shannon-Fano Code will be generated, (see also, Goodman, R. M., and Smyth, P. "Decision Tree Design from a Communication Theory Standpoint", IEEE Transactions on Information Theory 34, 979–994 (1988)). The label for each sub-class therefore would code for the "meaning" of the sub-class in an Information-Theoretically efficient way. Another modification can provide the ability to efficiently handle the necessary fuzziness of some classifications, such as those required for medical diagnoses.

To clarify one aspect of fuzziness, it is useful to consider the example of natural languages which seem to evolve in ways that preserve reasonably large phonetic gaps between most words (i.e., gaps in "phonetic space", not in connected speech). As a result, the vocabulary of American-English (well under $2^{20}$ words) occupies a minute fraction of the total phonetic space of a telephone channel (at about 15,000 bits per word, the channel could be used to distinguish $2^{15,000}$ possible different "words"). The evolution of organisms, through so-called species isolating mechanisms, also assures fairly large gaps between most species of organisms. Most conceivable hybrid or intermediate kinds of organism of the sort dog-elephant, do not exist. Likewise most possible "hybrid words", such dophant or gelph, are not found in English dictionaries.

The situation appears to be somewhat different in the kind of multi-dimensional space occupied by human diseases. Patients can exhibit any degree of illness, from normality to full-blown disease. Also, patients can, and occasionally do, suffer from both diabetes and anemia; heart disease and lung cancer; duodenal ulcer and pneumonia, etc., and with varying degrees of severity of each of the member pairs of the diseases. "Disease Space" therefore, does not necessarily contain as many large empty gaps between clusters that make digital subdivision of natural classes relatively easy. It would not be adequate if a machine, designed to provide automated diagnoses, were only able to recognize one out of three or four diseases which may simultaneously afflict a patient. Accordingly, a further embodiment of the present invention may be practiced, which is adapted for efficiently classifying fuzzy information.

Figure 5A:
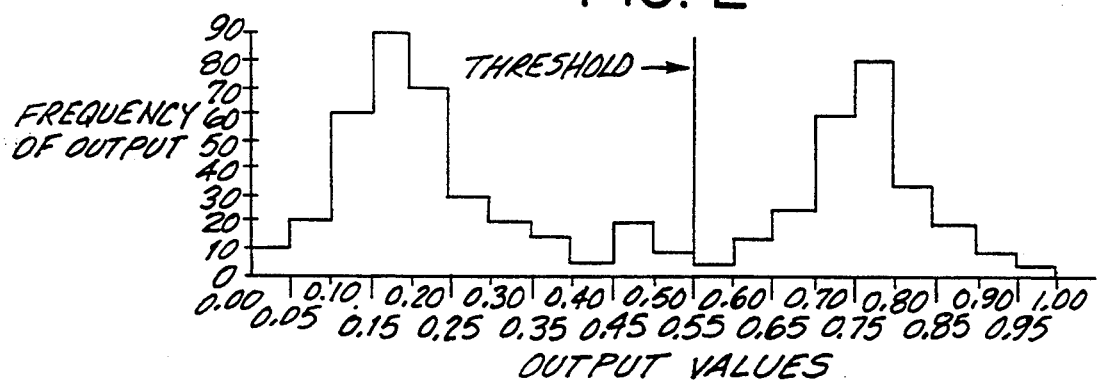
FIG. 5A depicts a histogram of the output values for an output column of two fuzzy populations, using a simple conventional threshold that arbitrarily classifies marginal transitional samples.
Figure 5B:
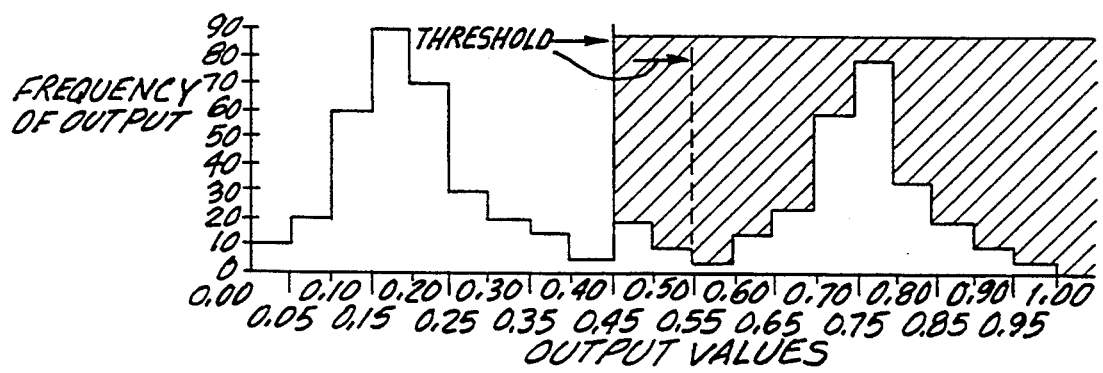
FIG. 5B and FIG. 5C depict a histogram of the output values for the same data as in 5a, but with paired thresholds, according to an embodiment of the present invention adapted for fuzzy populations to more usefully classify marginal transitional samples.
Figure 5C:
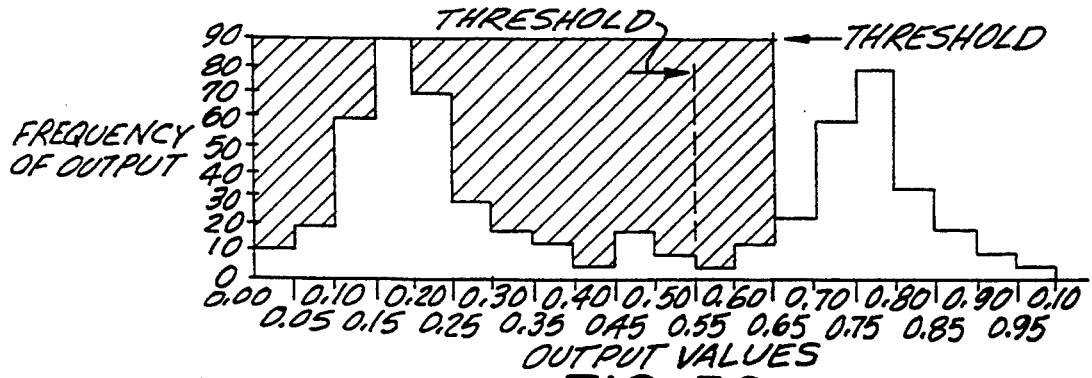

In accordance with this further embodiment, the stop-point for back propagation is set for a degree of convergence towards the Targets, such that a histogram of the Outputs looks approximately like FIG. 5A, (rather than FIG. 2 which represents a near-perfect match). Then double thresholds (i.e., nested hypersurfaces) for "fuzzy sets" can be defined, as in FIG. 5B and FIG. 5C, so that both sub-classes overlap and include, for example, the same $\approx 10\%$ marginal members.

An embodiment with approximately 10 percent overlap, and n=1, produces a finished classification tree with about 4 times as many branch tips as the previously described embodiments of the present invention. The increased number represents "duplicates" generally distributed in very different parts of the tree. However, this only requires two more levels of branching which corresponds to only two additional steps to decode each input. Since matching steps, in the trained network, are very fast, such an embodiment provides added diagnostic power with only a small additional throughput delay.

Although the above description provides many specificities, these enabling details should not be construed as limiting the scope of the invention, and it will be readily understood by those persons skilled in the art that the present invention is susceptible to many modifications, adaptations, and equivalent implementations without departing from this scope. For example, one skilled in the art could easily fashion many functionally equivalent methods which could serve to adjust a back propagation or back-propagation-like network to perform, without a teacher, following the various principles outlined above. "Back-propagation-like" is understood to include all feedforward neural network systems and methods, or their simulations, which compare target values to output values and use some variant of a delta rule to modify connection-weights, feeding backwards through the network layers, from output to input, (e.g., see Sankar and Mammone cited above; see also, Yamada, K. et al., "Handwritten Numerical Recognition by Multilayered Neural Networks with Improved Learning Algorithm," Proc. of Int. Joint Conf. on Neural Networks, Washington, D.C., Jun. 18-20, 1989, pp. 259-266, IEEE NY 1989), and of course includes conventional back propagation. Further, it is understood by one skilled in the art that randomly assigning initial values to targets is similar to the way values are typically initially assigned to weights in back propagation, and the subsequent repeated checks and readjustments of the targets, based on the differences between the targets and outputs, is likewise similar to the repeated application of the Generalized Delta Rule to check and readjust the weights in back propagation to try to achieve maximal rates of descent along error surfaces to global minima. It is, therefore, further understood that applications of variants of the Generalized Delta Rule to check and readjust the values of initially "randomized" targets are also encompassed by this invention.

In addition, as noted above, when using back propagation, it is typical practice arbitrarily to assign random values to network weights as training is initialized. Rumelhart, Hilton, and Williams (cited above) note that "If all weights start out with equal values and if the solution requires that unequal weights be developed, the system can never learn." They refer to this as a Symmetry Breaking problem because "all hidden units connected directly to the output inputs will get identical error signals, and since the weights changes depend on the error signals, the weights from those units to the output units must always be the same . . . We counteract this problem by starting the system with small random weights". This practice of initializing with random weights is also unbiased with respect to the nature of the learning task and therefore is universally applicable. However, the nature of back propagation is such that any arbitrary or non-arbitrary set of initial weights (other than sets of weights of equal values) will in fact also permit supervised learning with back propagation. In back propagation, and especially in unsupervised back propagation, the larger the number of samples in the training set, the slower the convergence. Therefore, methods which can increase the overall rate of convergence of unsupervised back propagation are of special interest. It will be useful to explore a strategy applicable to the construction of sub-nets of an hierarchical tree composed of neural networks which each generate two output classes. For instance, selecting a small random sub-set (e.g., 10 samples) of a much larger training set, constructing a network with two nodes in the hidden layer and one output node, and initializing random weights and executing an unsupervised back propagation (e.g., as described above), will converge relatively quickly and will probably recognize a "major" class and a residue class. If this process is repeated a few times with the same sample sub-set, but with new random weights, even though the sample sub-set is a statistically small sample, the classification produced in most of the repeated runs should be quite similar. Because the sample almost certainly contains some representatives of the major class (by definition), a set of final weights, from among those repeat runs which are more nearly in agreement with one another, would be a much better set (than random weights) for initializing unsupervised back propagation of the entire large training set. That is, on average, those weights will already "represent" (in Rumelhart et al.'s sense), at least the major class, better than almost any random set of weights, and therefore should lead to quicker and more robust convergence. This is only one example of many, which may utilize preliminary analysis of the training data set to develop non-arbitrary alternatives to random values for the initialization of weights for back propagation. And since non-arbitrary weights, assigned on the basis of some knowledge of the particular problem domain (e.g., see Yamada et al. cited above), or from some prior analysis of the training data set, may even lead to more rapid or more robust training than does initializing with a random set of weights, non-arbitrary or other arbitrary, rather than random assignment of initial values to connection weights, in an otherwise back-propagation-like method are also encompassed in this invention.

Also, as understood in the art, "binary" signifies two-valued and thus, representation of binary states with numeric values other than 0 and 1 (e.g., −1 and +1, etc.) are encompassed in this invention. Moreover, while the preferred embodiment is described according to assigning one of two values (i.e., binary valued) to each target output value, it can be understood that any one of a plurality of numeric values (i.e., multi-valued, or N-ary valued) may be assigned to a target outputs. Then, based on some measure of convergence, the target output value is permuted when the convergence condition is not satisfied. The value to which the target value is permuted may be random, arbitrary, or based on the magnitude of convergence itself.

These and other changes can be made without departing from the spirit and the scope of the invention and without diminishing its attendant advantages. It is therefore intended that the present invention is not limited to the disclosed embodiments but should be defined in accordance with the claims which follow.

I claim:

1. A method for training a neural network to generate classifications from a training sample signal set, said neural network having an input layer, an Output layer for providing an output vector signal having at least one component, and at least one hidden layer between the input layer and the output layer, each layer including nodes connected to nodes of successive layers, and wherein each connection between nodes of successive layers is characterized by an internal weight signal, said method comprising the steps of:

(a) arbitrarily assigning a numeric label to each training sample signal of said training sample signal set as a target vector signal for an output vector signal for classification, said numeric label selected from a set comprising a plurality of values;

(b) executing a back propagation-like training run by cycling through said training sample set, applying each said training sample signal to said input layer of said neural network, thereby generating said output vector signal for each said training sample signal, and modifying the internal weight signals of said neural network based on the differences between said output vector signals and their corresponding target vector signals;

(c) estimating the convergence of the components of said output vector signal towards the respective components of said target vector signal;

(d) permuting said components of each said target vector signal according to said convergence, thereby updating said target vector signal;

(e) repeating steps (b), (c), and (d) until a predetermined condition is satisfied, thereby generating a final set of said internal weight signals to be applied to the neural network for future classifications with said neural network.

2. The method according to claim 1, wherein said permuting step comprises permuting said component for a given said target vector signal only where the rate of convergence of said output vector signal components towards said given target vector signal components is less than the average distance between corresponding target vector signal and output vector signal components.

3. The method according to claim 1, wherein said predetermined condition is satisfied when, for each sample, the difference between said target vector and said output vector signals are within a predetermined acceptable maximum error.

4. The method according to claim 1, wherein said assigning step comprises assigning binary numeric values to each said component of said target vector signals.

5. The method according to claim 1, further comprising the steps of:

classifying additional samples with said neural network using said internal weight signals, thereby augmenting the number of classified samples, each classified sample an element of a sub-class;

classifying the members of each said sub-class according to steps (a) through (e), thereby generating further sub-classes and an additional independent set of said internal weights;

repeating said steps of classifying additional samples and classifying the members of each said sub-class, thereby generating a classification tree, until a predetermined condition for terminating classification is satisfied, said predetermined condition for terminating classification a separate condition from said predetermined condition; and saving all said independent sets of internal weights for future classification with the hierarchical neural network classification tree.

6. The method according to claim 5, wherein said predetermined condition is satisfied when said step of classifying each said sub-class does not substantially yield further sub-classes.

7. The method according to claim 5, wherein the number of output nodes in said neural network is up to nine.

8. The method according to claim 5, further comprising, after classifying each said sub-class, the steps of generating a histogram of the output vectors, and dividing said sub-classes into further sub-classes by selecting additional thresholds according to said histogram.

9. The method according to claim 8, wherein the number of output nodes in said neural network is one, and one to nine of said thresholds are used for dividing said sub-classes into two to ten further sub-classes.

10. A method for training a neural network to generate classifications from a training sample signal set, said neural network having an input layer, an output layer for providing an output vector signal having at least one component, and at least one hidden layer between the input layer and the output layer, each layer including nodes connected to nodes of successive layers, and wherein each connection between nodes of successive layers is characterized by an internal weight signal, said method comprising the steps of:

(a) arbitrarily assigning a numeric label to each training sample signal of said training sample signal set as a target vector signal for an output vector signal for classification, said numeric label selected from a set comprising a plurality of values;

(b) initializing values of the internal weight signals of said neural network;

(c) executing a back propagation-like training run by cycling through said training sample set, applying each said training sample signal to said input layer of said neural network, thereby generating said output vector signal for each training sample signal and modifying the internal weight signals of said neural network based on the differences between said output vector signals and their corresponding target vector signals;

(d) estimating the convergence of the components of said output vector signal towards the respective components of said target vector signal;

(e) permuting said components of each said target vector signal according to said convergence, thereby updating said target vector signals;

(f) repeating steps (c), (d), and (e) until a first predetermined condition is satisfied, upon which condition said internal weight signals are reinitialized;

(g) repeating steps (c), (d), (e), and (f) until a second predetermined condition is satisfied, thereby generating a final set of said internal weight signals to be applied to the neural network for future classifications with said neural network.

11. The method according to claim 10, wherein said first predetermined condition is satisfied when the difference between said target vector signals and said output vector signals is within a predetermined acceptable maximum error for a predetermined fraction of said samples.

12. The method according to claim 10, wherein said first predetermined condition includes any one of a plurality of conditions which may be satisfied.

13. The method according to claim 12, wherein a predetermined one of said plurality of conditions is tested for satisfaction at any given occurrence of step (f), and after any one of said plurality of conditions is satisfied.

* * * * *